Fig. 1.

No. 774,730. PATENTED NOV. 8, 1904.
T. VAN KANNEL.
MEANS FOR EXCLUDING DRAFTS FROM OPEN DOORWAYS.
APPLICATION FILED FEB. 26, 1903. RENEWED OCT. 8, 1904.
NO MODEL. 7 SHEETS—SHEET 2.

Attest:
L. Lee
Arthur T. Heaton

Inventor.
Theophilus Van Kannel,
per Thomas S. Crane, Atty.

No. 774,730. PATENTED NOV. 8, 1904.
T. VAN KANNEL.
MEANS FOR EXCLUDING DRAFTS FROM OPEN DOORWAYS.
APPLICATION FILED FEB. 28, 1903. RENEWED OCT. 8, 1904.
NO MODEL. 7 SHEETS—SHEET 3.

Attest:
L. Lee.
Arthur T. Heaton

Inventor.
Theophilus Van Kannel,
per Thomas S. Crane, Atty.

No. 774,730. PATENTED NOV. 8, 1904.
T. VAN KANNEL.
MEANS FOR EXCLUDING DRAFTS FROM OPEN DOORWAYS.
APPLICATION FILED FEB. 28, 1903. RENEWED OCT. 8, 1904.
NO MODEL. 7 SHEETS—SHEET 4.

Attest:
L. Lee.
Arthur F. Heaton

Inventor.
Theophilus Van Kannel,
per Thomas S. Crane, Atty.

No. 774,730. PATENTED NOV. 8, 1904.
T. VAN KANNEL.
MEANS FOR EXCLUDING DRAFTS FROM OPEN DOORWAYS.
APPLICATION FILED FEB. 28, 1903. RENEWED OCT. 8, 1904.
NO MODEL. 7 SHEETS—SHEET 5.

Attest:
L. Lee.
Arthur F. Heaton.

Inventor.
Theophilus Van Kannel,
per Thomas S. Crane, Atty.

Fig. 11.

No. 774,730. Patented November 8, 1904.

UNITED STATES PATENT OFFICE.

THEOPHILUS VAN KANNEL, OF BEDFORD PARK, NEW YORK.

MEANS FOR EXCLUDING DRAFTS FROM OPEN DOORWAYS.

SPECIFICATION forming part of Letters Patent No. 774,730, dated November 8, 1904.

Application filed February 28, 1903. Renewed October 8, 1904. Serial No. 227,653. (No model.)

*To all whom it may concern:*

Be it known that I, THEOPHILUS VAN KANNEL, a citizen of the United States, residing at Bedford Park, county of New York, State of New York, have invented certain new and useful Improvements in Means for Excluding Drafts from Open Doorways, fully described and represented in the following specification and the accompanying drawings, forming a part of the same.

The object of this invention is to furnish a means of excluding wind, snow, rain, and dust from open doorways so as to furnish the protection afforded by closed doors without obstruction to the free movement of passers which is caused by doors adapted to exclude the elements.

Heretofore revolving doors, which form the most improved device for the purpose, have been employed in the winter season to exclude wind from doorways, while permitting the movement of passers; but the wings of revolving doors are an inconvenient obstruction to the free movement of passers and give only a limited capacity for a given width of entrance. Such revolving doors are commonly removed in the warm season, and if the doorway be left open or ordinary swing-doors be used a great amount of dust is liable to enter. The entrance of dust through windows can be more or less prevented by suitable screens and ventilation obtained by filtered air; but as these safeguards do not apply to an open doorway the damage occasioned by the entrance of dust through such a doorway is very great and has in average stores been estimated at several thousand dollars per season.

In the present invention I prevent the entrance of dust or wind through an open doorway by projecting an opposing blast of air outwardly from the doorway, such blast being emitted from suitable nozzles in the top, bottom, or side walls of the doorway or in the corresponding walls of a passage-way extended inward from the door or from an air-chamber arranged in any suitable position in the required proximity to the doorway to direct the blast toward the same. The direction of the blast outwardly is facilitated and means for regulating the blast more readily applied if a narrow passage-way of sufficient width for only a single file of persons be extended inward from the doorway a sufficient distance. The walls, floor, or ceiling of such passage-way may then be provided with blast-chambers having outlets inclined toward the doorway, the chambers being supplied with air under pressure, which pressure may be regulated to counterbalance any entering current. The passage-way is thus entirely open for the movement of passers either inward or outward, while the entrance of wind or dust are effectively prevented.

To fill the passage-way with an outward blast of air, so as to wholly exclude entering currents, the passage-way is preferably made of suitable width—say thirty inches—to permit the free movement of passers in one direction only and a similar adjacent passage-way provided for movement in the opposite direction.

To automatically proportion the pressure of the blast to the current tending to enter the passage-way, a balanced valve may be inserted in the conduit which supplies the blast, and a yielding surface or surfaces affected by variations of pressure or velocity of the air in the passage-way may be connected mechanically with such balanced valve, so as to increase the air-blast when the outside current presses more forcibly into the passage-way or to diminish the blast when the outside current becomes weaker than the blast.

Various modifications of the invention are shown in the annexed drawings, in one of which the opposed walls of the passage-way are provided with vacuum-chambers adjacent to the blast-chambers, so that circuits of the air-blast are constantly moving from the blast-chambers to the vacuum-chambers, the momentum and velocity of such air-blast currents preventing the wind from entering the building. In such case the blast would be produced by a rotary fan or blower and the vacuum-chambers connected with the intake of the fan. The passage-way may be extended partly outside of the building, and the blast-chambers upon its side may be connected with an air-box upon the top of the passage-way outside the building, and the same current of wind which tends to enter the passage-way may also be conducted into such air-box by deflectors extended upwardly at a suitable angle from the top of such air-box. The air introduced to the air-box is discharged from the blast-chamber and operates in great degree to oppose the air-current entering the doorway.

Figure 1:
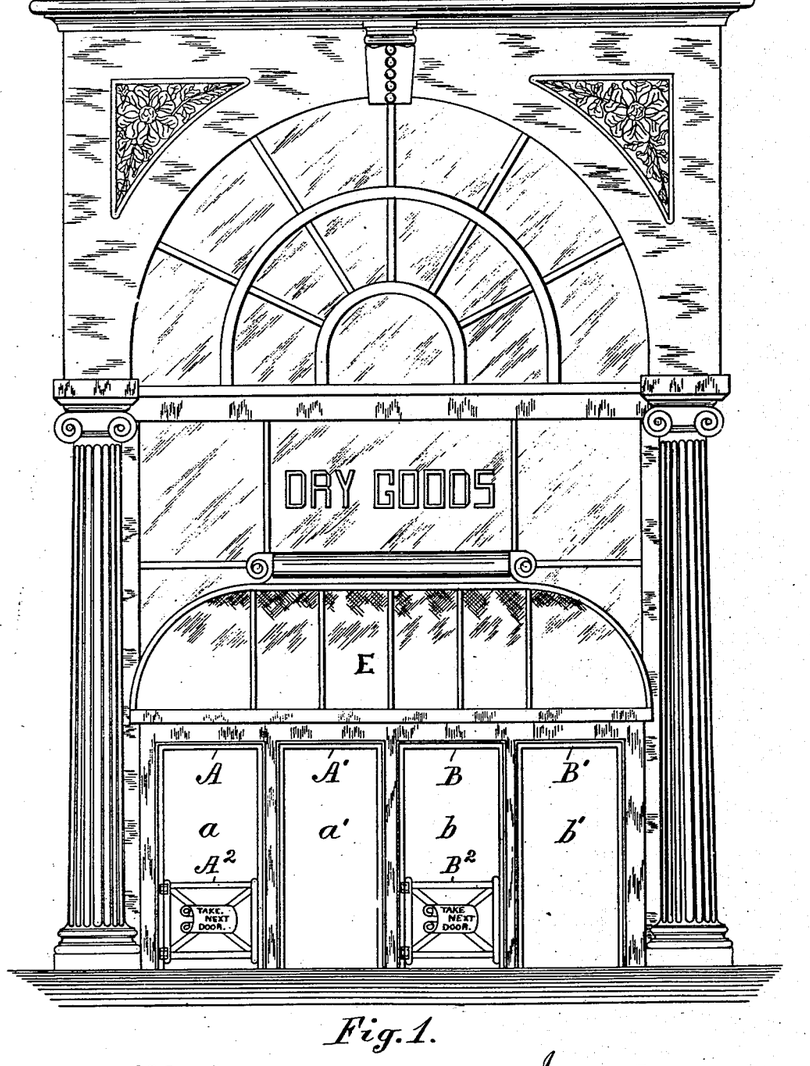
Figure 1 is a front elevation of the entrance to a large building provided with four doorways.

In Fig. 1 the vestibule for a large building E is shown with four open doorways A A' B B', having passage-ways $a$ $a'$ $b$ $b'$ extended inwardly therefrom, the doorways A and B being provided with hinged wickets A² B², adapted to open outward only and labeled to direct entering passers to the passage-ways $a'$ and $b'$. The inner ends of the passages $a'$ and $b'$ would be provided, as shown at $a^3$ in Fig. 2, with similar wickets directing the outgoing passers to the passage-ways $a$ and $b$.

Doors D are shown hinged to the inner side of each door-frame for closing the passage-ways at night or when the weather is very stormy. Such doors are preferably sunk in recesses in the opposite sides of the passage-ways, as shown in Fig. 2.

Figure 2:
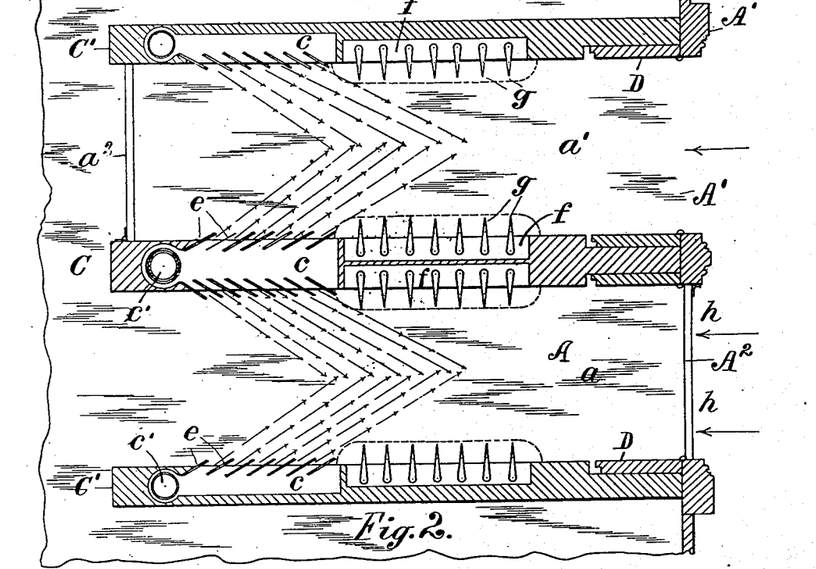
Fig. 2 is a plan of two adjacent passageways provided with blast-nozzles and blast-regulating apparatus.

Fig. 2 shows the construction suited for two doorways A A' only, the dividing-wall or partition C between the two passage-ways $a$ and $a'$ being constructed to furnish and direct blasts into both the passage-ways, while each of the outer walls C' is shown provided only with means for discharging the blast into one of such passage-ways. Where more than two passage-ways are provided, as shown in Fig. 1, all the partition-walls would be constructed (like the wall C) to discharge the blast into two adjacent passage-ways.

$c$ designates the blast-chambers formed in the walls and supplied with the vertical conduit $c'$. Inclined slats $e$ are fixed in the outer side of the blast-chamber to deflect the air toward the doorway A or A', the blast from the opposing walls meeting in the middle of the passage-way and filling the whole of the same, so as to effectively oppose any entering current.

Figure 5:
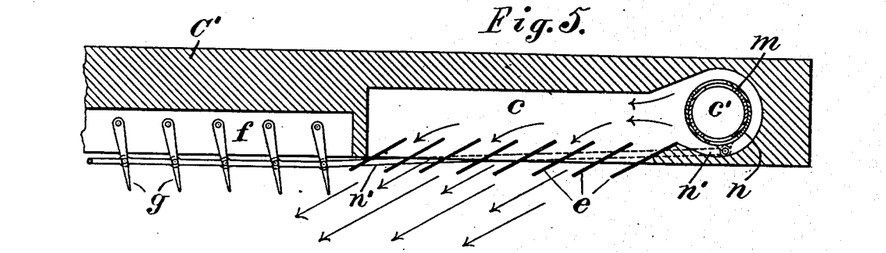
Fig. 5 is a plan, upon an enlarged scale, of one wall of a passage-way, showing the connection between the regulating-wings and the balanced valve of the blast-conduit.

*Means for automatically regulating blast.*—Adjoining the chambers $c$ are recesses $f$ in the walls, in which regulating-wings $g$ are hinged and projected sufficiently into the passage-way to be affected by any passing current of air. Such wings, as shown in Fig. 5, are connected together and their movement utilized to operate the means which regulates the blast of air to the chambers $c$. It is obvious that when the blast exceeds the wind which tends to enter the passage-way the blast would move toward the doorway A, and thus push the wings outwardly, which movement of the wings would be used to diminish the force of the blast. When the wind-pressure (indicated by the arrows $h$) exceeds the pressure of the air-blast, the wind would enter the passage-way and push the wings inwardly, which movement would be utilized to increase the force of the blast, and thus neutralize the entering current.

Figure 8:
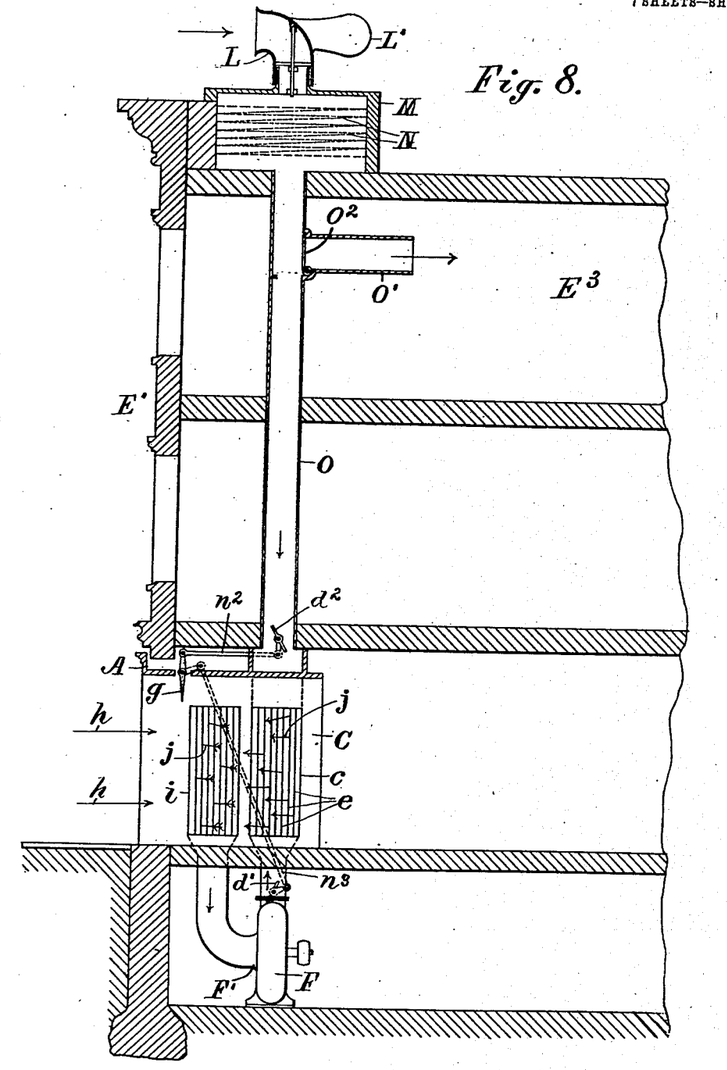
Fig. 8 is a vertical section of a building with sundry appliances for supplying the blast to the doorway.
Figure 11:
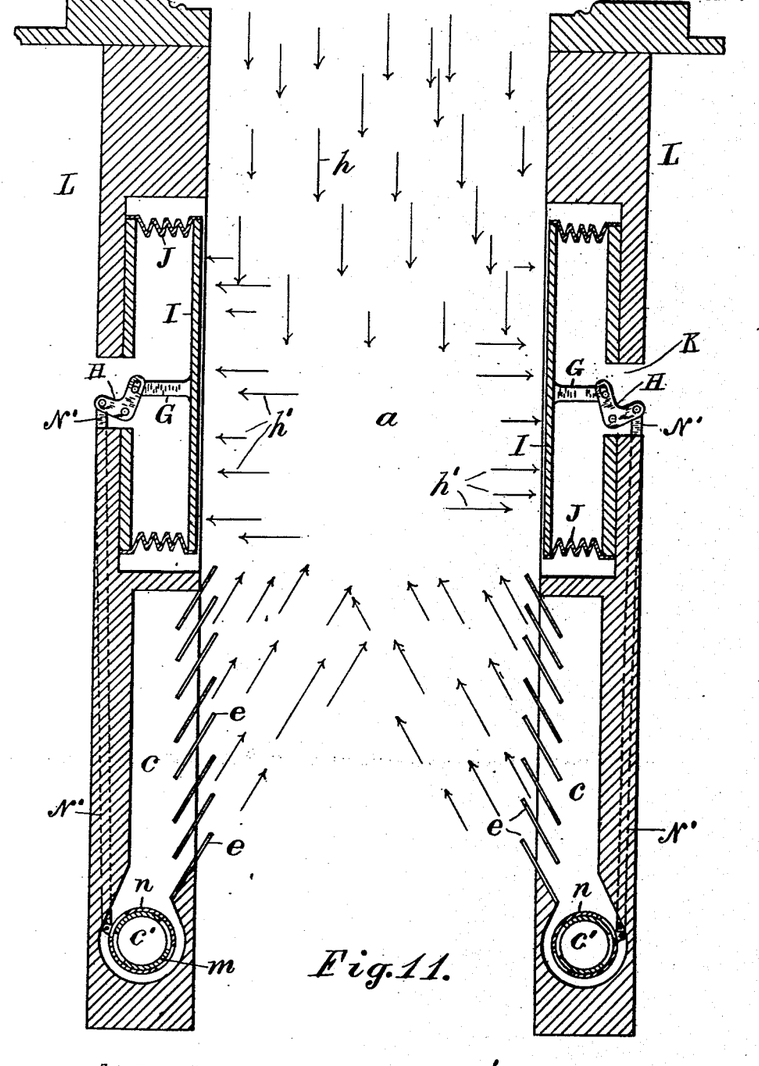
Fig. 11 shows a plan of a further modification with a bellows-box to act as a regulator of the blast.

Springs may, if required, be applied to the wings to balance any portion of the pressure or to aid in moving the blast-valve connected with the wings. The blast delivered to the chambers may be regulated by forming the conduit $c'$, as shown in Fig. 5, with a vertical slotted tube $m$ and surrounding the same with a slotted shell $n$, the oscillation of which, by means of the connection $n'$ to the wings $g$, serves to vary the outlet of the blast. A balanced butterfly-valve may, if preferred, be inserted in the conduit at any convenient point and operated by connection to the wings. Such a valve $d'$ is shown in Fig. 8 operated by the connection $n^2$. Instead of the wings a box with flexible sides like an organ-bellows may be formed on the wall of the passage-way and the interior of the bellows connected with the apartment to which the passage-way opens. Such a regulator is shown in Fig. 11, the box I having flexible sides J, and its movable wall having a connection G to a bell-crank H, which is also connected by a link N' to the slotted shell $n$. The variations of pressure upon the walls of such bellows would produce a movement of its outer plate which would operate the regulating apparatus, as already described.

The wings $g$ are shown protected from passers by a net or guard $g'$.

Figure 3:
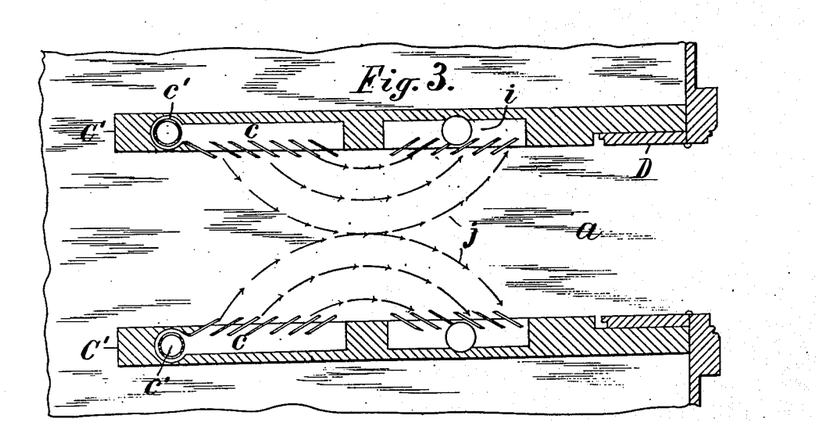
Fig. 3 is a plan of a single passage-way having exhaust-chambers upon the sides of the passage-way to form continuous circuits of outwardly-moving air in the passage-way to prevent a current from entering.

*Blast-circuits to oppose wind.*—In Figs. 3 and 8 suction-chambers $i$ are shown in the walls C of a passage-way adjacent to the blast-chambers $c$, and such vacuum-chambers are shown in Fig. 8 connected with the suction-opening F' of the fan F, which furnishes the blast to the blast-chambers $c$. Such arrangement of the blast and suction chambers produces continuous air-circuits, as indicated by the arrows $j$ in Fig. 3 and Fig. 8, which fill the passage-way with an outward current and prevent the wind from entering.

Figure 4:
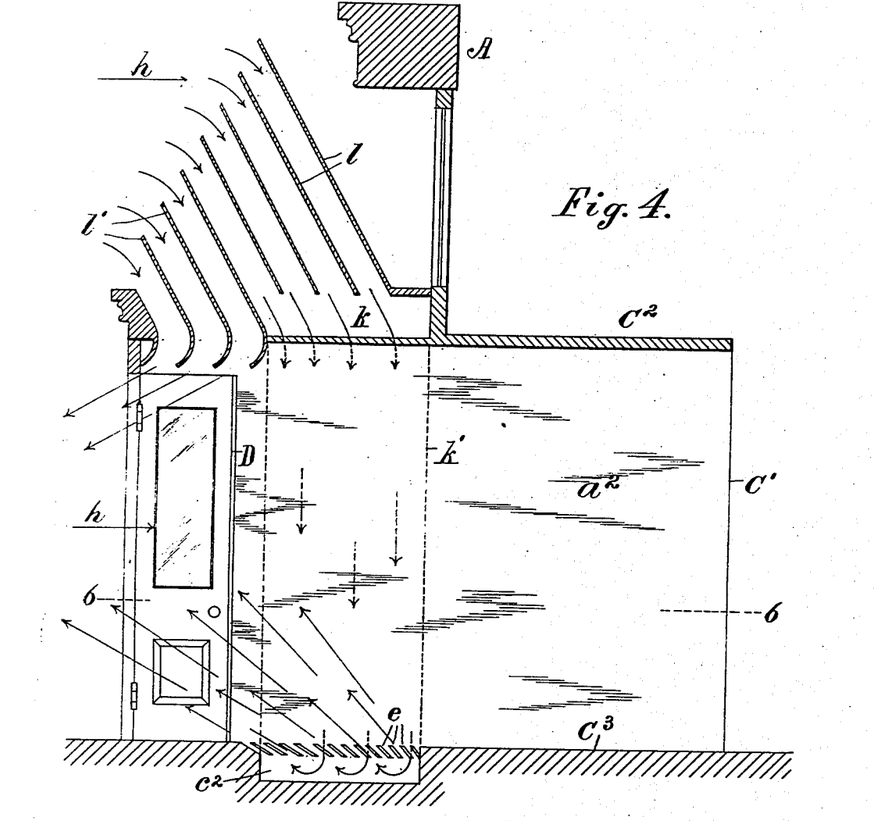
Fig. 4 is a longitudinal section of a passage-way extended partly outside of a building and having the blast-chamber upon the walls of the passage-way connected with the outer air.
Figure 6:
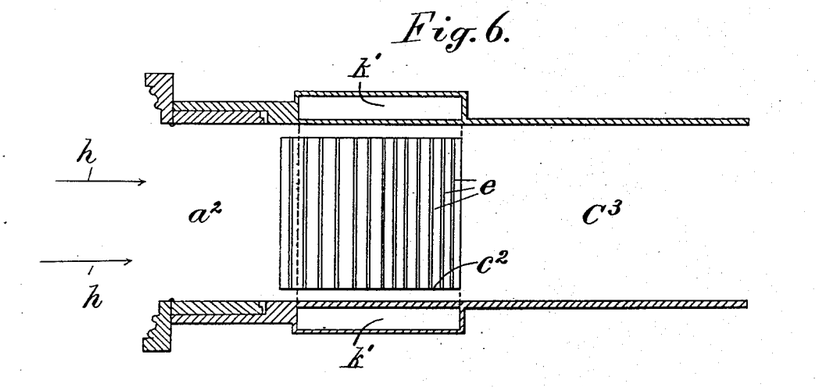
Fig. 6 is a horizontal section of the passage-way shown upon the line 6 6 in Fig. 4.

*Opposing blast generated by wind-currents.*—Figs. 4, 6, and 8 show means for intercepting a current of the wind upon the exterior of the building and leading the same through conduits to the blast-chambers upon the passage-way, so as to oppose the wind which tends to enter such passage-way. In Figs. 4 and 6 a passage-way $a^2$ is shown, having roof $C^2$, one-half of which is extended outwardly beyond the front of the building, and a box $k$, formed upon the roof of such outward portion and connected by ducts $k'$ with a blast-chamber $c^2$, which is shown in the floor of the passage-way. Deflectors $l$ are sloped upwardly and outwardly from the top of the box, so that the wind (indicated by the arrows $h$) which blows toward the building or passage-way $a^2$ is partly intercepted and deflected downwardly into the box and thence to the blast-chamber $c^2$.

The upper surface of the blast-chamber is provided with metallic slats $e$, set sufficiently close together to form a floor and inclined to discharge the air toward the doorway. Deflectors $l'$, adjacent to the deflectors $l$, are also connected with ducts which lead through the roof $C^2$ of the passage-way and are inclined toward the doorway, so as to discharge forwardly the wind which is caught by the deflectors $l'$. An outwardly-moving current is thus generated in the passage-way upon opposite sides of the same which has the same force as the inwardly-moving current, excepting the loss caused by friction in the channels through which it passes and suction caused by buoyancy of warm air within the building.

Where a building is heated in the cold season, the current of cold air entering the doorway tends to move most forcibly along the floor or lower part of the passage-way, and where such conditions exist it is especially desirable to place one of the blast-chambers in the floor of the passage-way, as shown in Fig. 4. As the force of the air conducted into the passage-way by the deflectors is proportioned to the force of wind blowing toward the building, the pressure opposed to the entering current is automatically regulated.

Fig. 8 shows means for utilizing the external wind-pressure when available and at other times of supplying the blast-chamber by means of a fan. The wind-deflector is shown as a pivoted cowl L, located upon the top of the building to secure a more steady air-current and combined with an air-filter to remove dust from the air when the air is used only for ventilation. As the outer air tends to enter a heated building near the ground, a current tends to enter the doorway, even when no wind is blowing near such doorway. If a wind be blowing in some other direction at the top of the building, it may be utilized to oppose the entering current by using the pivoted cowl L, having a vane L' to keep it turned toward the wind. The cowl is shown connected by duct O with blast-chambers $c$ in the side of the passage $a$ and with a branch pipe O' discharging into the upper part of the building. A valve $O^2$ is shown at the junction of the pipes O and O' to close the branch, as represented, when the wind is used to supply the blast-chamber $c$. When not thus used, the valve would be turned to throw the air into the apartment $E^3$ at the top of the building. This air being filtered is adapted for diffusion throughout the building without injury to its contents. The cowl may thus be used for ventilation in warm weather or when the current is not strong enough to protect the doorway. When of sufficient strength, the current generated by the wind itself operates automatically to exclude a great part of the entering current and serves to greatly reduce the admission of wind and dust to the building without the expense of operating any blast machinery.

A wing $g$ is shown in the roof of the passage-way in Fig. 8, connected by rod $n^2$ with a butterfly-valve $d^2$ in the duct O to regulate the discharge of the blast. The fan F is shown with its suction-opening F' connected to a vacuum-chamber $i$ in the wall of the passage-way and its outlet-pipe connected with the blast-chamber $c$. A butterfly-valve $d'$ is shown in said outlet-pipe and connected by a rod $n^3$ with the wing $g$, and such wing thus operates to regulate the blast, whether derived from the wind or the fan.

Figure 7:
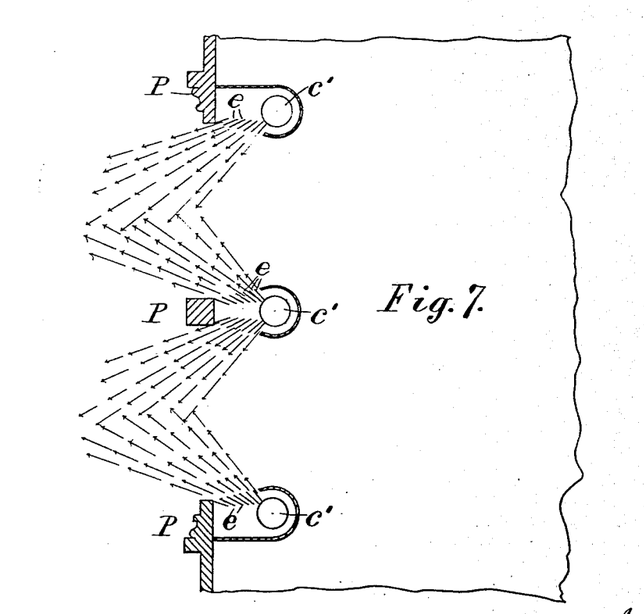
Fig. 7 is a plan of a doorway with door-jambs having blast-chambers and vanes for discharging a blast directly in the doorway.

*Direct protection of doorway.*—The extension of a narrow passageway inward from the doorway facilitates the application of the opposing blast as well as the mechanical means which may be required for regulating the force of such blast; but where such a passage-way cannot be extended inwardly the doorway can be protected from the entrance of wind by forming the door-frame or door-jamb P upon opposite sides with the blast-chambers $c$ and providing a suitable hinged wing $g$ upon an additional side of the doorway—as, for instance, the top—to operate the regulating mechanism. The face of the door-frame P is shown inclined inwardly toward the passage, and the slats $e$, as the series extends inward from the entrance, incline more and more toward the middle of the passage, by which arrangement the entering wind is intercepted very effectively.

Figure 9:
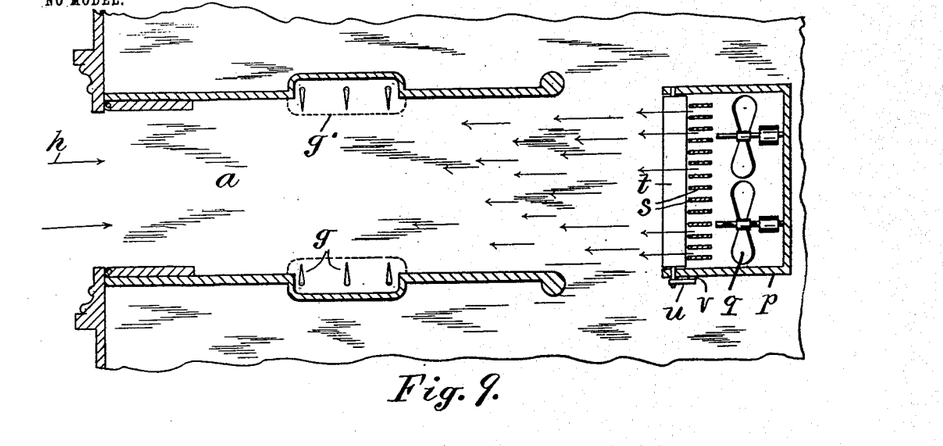
Fig. 9 shows the blast discharged from a blast-box opposite the doorway in plan, like Figs. 2 and 3.
Figure 10:
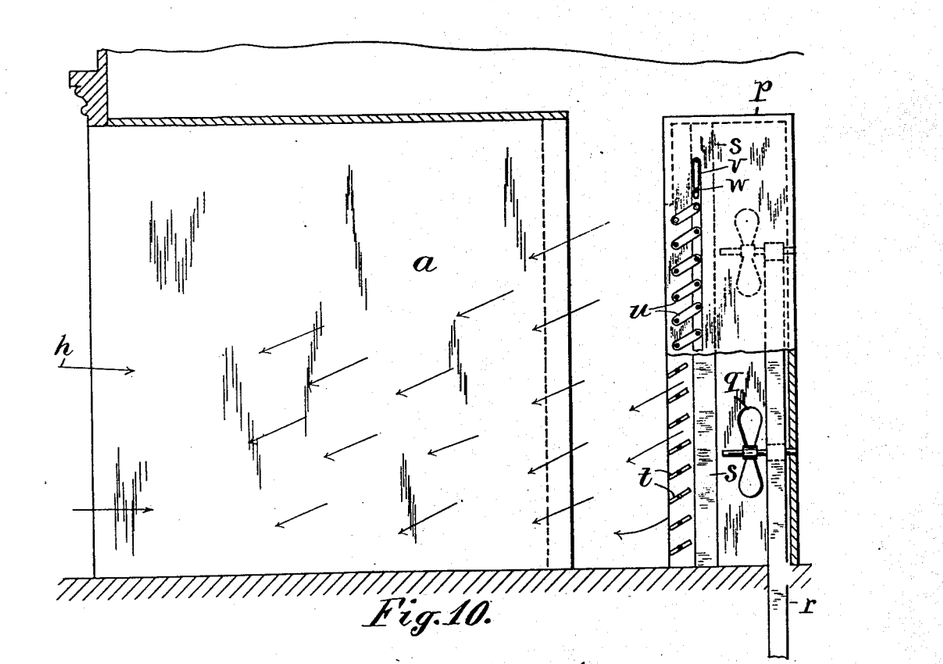
Fig. 10 shows the same in vertical section, like Fig. 4.

Figs. 9 and 10 show a means of opposing the entering current without forming any blast-chambers in the door-posts or walls of the passage-way, the blast-box $p$ being shown within the building opposite the doorway, which in this figure is shown provided with a passage-way; but such passage-way is not a necessary adjunct when the blast-box is used. Fans $q$ are shown within the blast-box directing the wind toward the doorway, all of which may be driven by a simple belt $r$. The blast-box $p$ furnishes the blast-chamber in this form of the invention. Vertical slats $s$ within the box serve to direct the air forwardly, and a series of pivoted blind-slats $t$ are shown journaled transversely in the front of the box and adjusted by means of crank-arms $u$ and a rod $v$, provided with a clamp-screw $w$. The adjustment of the blind-slats is provided to throw the air downwardly when necessary in cases where the entering current is strongest in the lower part of the doorway or passage-way extended therefrom. As the cold air tends to escape from the building through the upper part of the passage-way, the entering current requires the strongest opposition in the lower part, which the adjustability of the slats permits.

The various means shown herein for opposing the current entering at a doorway may be used to suit various conditions existing in the buildings to which the invention may be applied; but such variety shows that the construction and location of the means for producing the opposing blast may be widely varied without departing from my invention, which consists, essentially, in opposing by means of an outwardly-directed blast the wind or air current which tends to enter an open doorway. It is obvious that any suitable blower may be used to mechanically generate the required blast in this invention.

The wickets $A^2$ $a^3$ $B^2$ in Figs. 1 and 2 are shown of skeleton form and have no effect in retarding the entrance or exit of the air and are intended to be of such construction as not in any degree to oppose the free movement of passers in the proper direction through the doorways.

Where a plurality of doorways is used side by side, their use is very greatly facilitated by appropriating the alternate doorways to the passers moving in opposite directions, and any means may be used to direct the passers to such doorways.

The term "blast-chamber" has been used herein as descriptive of the chamber from which the air is projected toward the doorway, and the term "blast" is used in connection with such blast-chamber as descriptive of the current of air which moves therefrom in sufficient volume to suitably oppose and neutralize any entering current. The term "blast" is not in this application used in the sense in which it is sometimes employed to signify a current moving at a particularly high velocity, but designates the current which is projected toward the doorway at any suitable velocity to prevent the entrance of the external air.

Having thus set forth the nature of the invention, what is claimed herein is—

1. The combination, with an open doorway, of a blower to provide an air-blast, an air-chamber in proximity to the doorway and in connection with said blower, and means upon such air-chamber for directing the air outward toward and through the open doorway.

2. The combination, with a doorway, of means to direct an air-blast outwardly through such doorway, and means operated by variations in the movement of the air in the doorway to regulate the force of the outward blast.

3. The combination, with a doorway having a passage-way extended inward from the entrance, and the wall, floor or ceiling of such passage-way provided with a blast-chamber, of means for supplying air to such chamber, and means for directing toward the entrance of the passage-way the air discharged from such chamber.

4. The combination, with a doorway having a passage-way extended inward from the entrance, and the wall, floor or ceiling of such passage-way provided with a blast-chamber, of means for supplying air to such chamber, means for directing toward the entrance of the passage-way the air discharged from such chamber, means for regulating the force of such air-blast, and a wing or movable plate in the passage connected with such regulating means and operated by the air-current entering the passage, to control such regulation automatically.

5. The combination, with a doorway having a passage-way extended inward from the entrance, and the wall, floor or ceiling of such passage-way provided with a blast-chamber, of means for supplying air to such chamber, means for directing toward the entrance of the passage-way the air discharged from such chamber, a conduit supplying air to the blast-chamber, a valve in the conduit and a yielding wing upon the wall of the passage-way with connection to such valve, and operated by the entering current to regulate the outward blast.

6. The combination, with a doorway having a passage-way extended inward from the entrance, and the wall, floor or ceiling of such passage-way provided with a blast-chamber, of means for supplying air to such chamber, means for directing toward the entrance of the passage-way the air discharged from such chamber, a conduit supplying air to the blast-chamber, a valve in the conduit, hinged wings projected into the passage to be operated by the air-currents, and a guard over such wings to protect them from the passers.

7. The combination, with an open doorway having a passage-way extended inward from the entrance, of an air-chamber in proxity to the passage-way, an air-blower connected to supply an air-blast to the chamber, and means upon the chamber adapted to direct the air, and fill the passage-way with an outward blast to exclude entering currents.

8. The combination, with a doorway having passage-way extended inward from the entrance, and having blast-chambers in opposite sides with means for supplying blast thereto, of means for directing the blast toward the entrance so as to wholly fill the passage with an outward blast to exclude entering currents.

9. The combination, with a doorway having passage-way extended inward from the entrance, and the wall, floor or ceiling of such passage-way provided with a blast-chamber, means for directing toward the entrance of the passage-way the air discharged from such chamber, a conduit connecting such chamber with the outer air, and a deflector connected with the mouth of such conduit and exposed to the outer wind-currents to deflect the same into the conduit, and chamber, so as to oppose the entering current.

10. The combination, with a doorway having a passage-way extended inward from the entrance, and the floor, wall or ceiling of such passage-way provided with a blast-chamber, means for directing toward the entrance of the passage-way the air discharged from such blast-chamber, a conduit extended from such blast-chamber to the roof of the building, and a deflector above the roof of the building to direct the wind into such conduit.

11. The combination, with a doorway having a passage-way extended inward from the entrance, and the floor, wall or ceiling of such passage-way provided with a blast-chamber, means for directing toward the entrance of the passage-way the air discharged from such blast-chamber, a conduit extended from such blast-chamber to the roof of the building, and a pivoted cowl connected with such conduit above the roof of the building, to direct the wind from any quarter into such conduit and blast-chamber.

12. The combination, with a doorway having a passage-way extended inward from the entrance, and the floor, wall or ceiling of such passage-way provided with a blast-chamber, means for directing toward the entrance of the passage-way the air discharged from such blast-chamber, an air-filter connected with such blast-chamber by a conduit, and a deflector above the roof of the building connected to such air-filter to discharge air through the same into the blast-chamber.

13. The combination, with a doorway having a passage-way extended inward from the entrance, and a floor in such passage-way provided with a blast-chamber, of means for supplying air to such floor blast-chamber, and means for directing toward the entrance of the passage-way the air discharged from such chamber.

14. The combination, with the doorway of a building, of a blast-box within the building opposite to such doorway at a suitable distance to permit entrance, means for discharging air from the box, and slats upon the box for directing the blast toward the doorway.

15. The combination, with the doorway of a building, of a blast-box within the building opposite to such doorway at a suitable distance to permit entrance, means for discharging air from the box, and slats adjustable upon the box for directing the air upward or downward toward the doorway.

16. Apparatus for preventing air-drafts through doorways, comprising means for directing opposed and automatically-counterbalancing air-currents therethrough.

17. Means for directing air-currents outwardly through a doorway, in combination with means controlled by the pressure of incoming air-currents, for automatically regulating the force of such incoming currents.

18. In combination with a doorway, means controlled by the current of incoming air for producing opposed and automatically-balancing air-currents.

19. In combination with an extended doorway-passage having outwardly-inclined air-vents in its wall, air-blast apparatus communicating therewith and means actuated by incoming air-currents for automatically controlling the force of the air-currents through said vents.

In testimony whereof I have hereunto set my hand in the presence of two subscribing witnesses.

THEOPHILUS VAN KANNEL.

Witnesses:
 THOMAS S. CRANE,
 L. LEE.